July 30, 1929.                    F. H. BEACH                    1,722,365
                                   FENCE GATE
                              Filed Nov. 23, 1927
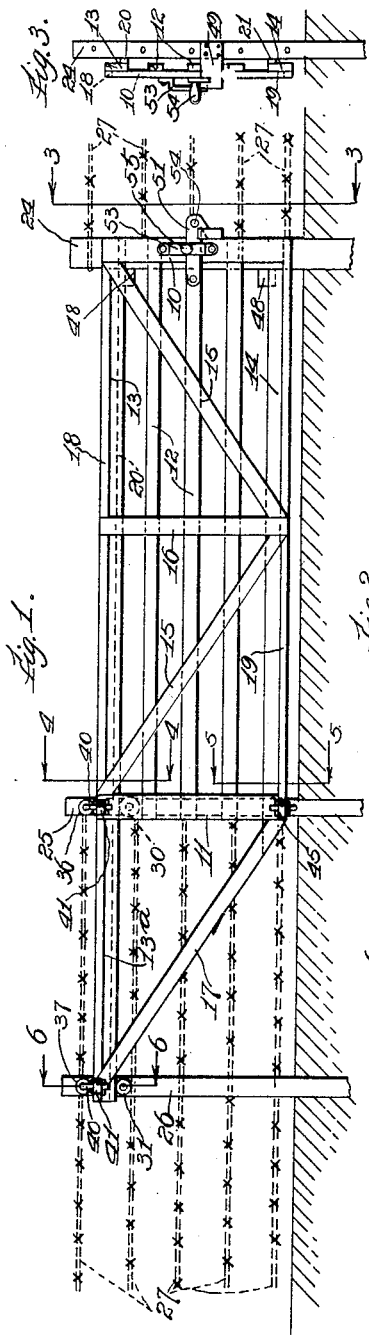
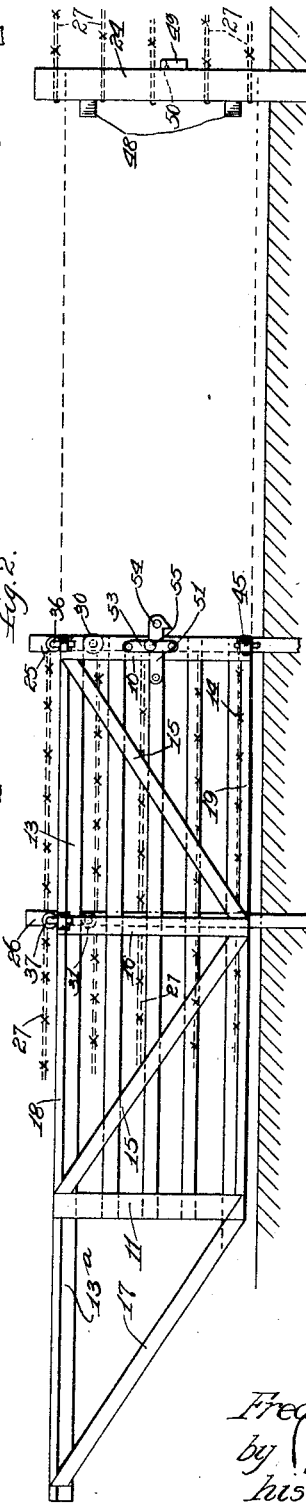
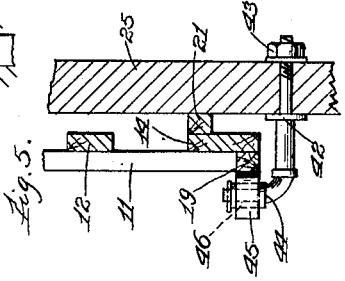
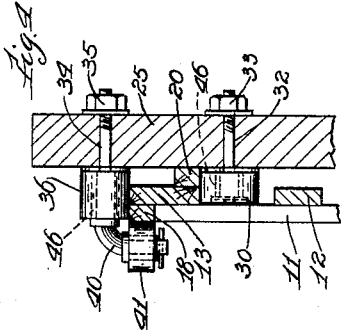
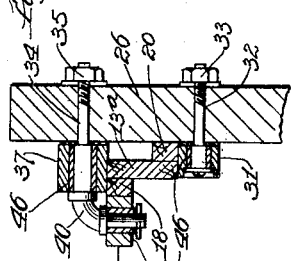
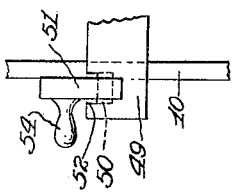
Inventor.
Frederick H. Beach.
by his Attorneys.
Witness Patented July 30, 1929.

1,722,365

UNITED STATES PATENT OFFICE.

FREDERICK H. BEACH, OF BATAVIA, ILLINOIS.

FENCE GATE.

Application filed November 23, 1927. Serial No. 235,145.

This invention relates to gates for enclosures such as fences or the like, and has for its object to provide a gate of simplified and improved construction which may be economically manufactured. A further object of the invention is to so construct the gate that it may be easily moved to open and closed position. It consists in the features and elements of construction herein shown and described as indicated by the claims.

In the drawings;

Figure 1 is a side elevation of my improved gate shown in closed position.

Figure 2 is a side elevation of the gate in open position.

Figure 3 is an end view of the gate taken as indicated at line, 3—3, on Figure 1.

Figure 4 is a vertical section through the upper portion of the gate and upright supports, taken at line, 4—4, Figure 1.

Figure 5 is a vertical section through the lower portion of the gate and upright taken at line, 5—5, on Figure 1.

Figure 6 is a vertical section through the overhanging arm and upright support taken at line, 6—6, on Figure 1.

Figure 7 is an enlarged fragmentary detail view of the latch shown in Figure 3.

As illustrated in the drawing, the gate proper, comprises a pair of longitudinally spaced vertical end members, 10 and 11, to which are secured a plurality of vertically spaced intermediate bars, 12, and bars, 13 and 14, at the upper and lower edges of the gate respectively. These bars are all connected together and reinforced by suitable cross braces, 15, and upright center brace, 16. At the upper edge of the gate, bar, 13, extends rearwardly beyond the upright, 11, as indicated at 13ª, and is in effect an overhanging beam or arm which is reinforced by a diagonally disposed brace, 17, connected to the rear end of the lower edge gate bar, 14, as shown in Figure 1. Track bars, 18 and 19, are secured to the respective upper and lower outside edges of the bars, 13 and 14, abutting against and flush with the vertical members, 10, 11, 16, and bracing members, 15. Track bars, 20 and 21, are secured to the respective lower and upper inside edges of the gate bars, 13 and 14. These track bars are also positioned flush with the respective upper and lower edges of the bars, 13 and 14. The track bars, 18 and 20, extend along the bar, 13ª, as a continuation of the bar, 13.

A pair of upright gate posts, 25 and 26, are positioned on opposite ends of the gate opening, corresponding to the gate length between the end members, 10 and 11, the post, 25, serving to secure the gate in closed position as will hereinafter appear. A post, 27, is positioned in line with posts, 25 and 26, and at a distance rearward of post, 26, slightly more than the length of the overhanging arm, 13ª. These posts may serve as the fence posts to which are secured a suitable number of strands of barbed wire, 27, or other fencing material.

The gate is supported for longitudinal movement into open and closed positions on the rollers, 30 and 31, journaled on bolts, 32, extending horizontally through and fixed to the respective posts, 25 and 26, by the nuts, 33. As shown in Figures 4 and 6, these rollers are positioned for rolling contact with a track formed by the bottom surfaces of the bar, 13, and track bar, 20, to support the gate. It will be noted that roller, 30, supported on post, 25, is considerably larger in diameter than rollers, 31, because it carries the major portion of the weight. Secured to the posts, 25 and 26, above the rollers, 30 and 31, are fixtures, 34, extending horizontally through said posts, parallel to bolts, 32, and held in position by nuts, 35. Rollers, 36 and 37, are journaled on said fixtures with their peripheries in contact with a track formed by the upper surfaces of bar, 13 and track bar, 18. It is obvious that when the gate is in closed position as shown in Figure 1, there is a tendency of the forward end of the gate to tilt downward about the pivot of roller, 30; this downward force is counteracted by the roller, 37, engaging the upper surface of track, 18, at the end of the overhanging beam or arm, 13ª. As the gate is rolled rearwardly in opening direction, a point will be reached at which the gate is in substantial balance on roller, 30, and due to the large diameter of the roller the gate may be easily moved. As the gate approaches open position, it tends to tilt rearwardly about roller, 31, but is counteracted by the roller, 36, on post, 25. This construction affording a substantially rolling support for the gate at all times enables it to be moved with very slight effort.

The fixtures, 34, are provided with downwardly depending extensions, 40, on which are journaled rollers, 41, positioned for rolling contact with the vertical outer surface of track bar, 18, for guiding the gate during its longitudinal movement. The bar, 13, and track bars, 18 and 20 are so proportioned that the vertical inner surface of track bar, 20, is held in sliding contact with the posts, 25 and 26, by said rollers. Thus it is clear that the rollers on top and bottom and at one side and the posts at the other serve to confine the gate sliding movement to its true plane. A fixture, 42, is provided adjacent the bottom of post, 25, and secured thereto by a nut, 43; said fixture includes an upright arm, 44, on which is journaled a roller, 45, in rolling contact with the vertical outer surface of track bar, 19, on the lower edge of the gate which maintains the inner vertical side of track bar, 21, in sliding contact with the post, 25, to prevent lateral swinging of the gate.

The rollers are all preferably metal such as iron or steel and are mounted on a bushing, 46, of a material such as bronze so that the rollers will not corrode or "freeze" onto the bolts or fixtures on which they are journaled.

A pair of guide blocks, 48, are secured to the inside surface of post, 24, and are tapered in the direction of gate closing, for guiding and deflecting the forward end of the gate to position it against the front side of post, 24, when in closing position. A locking block, 49, is secured to the side of the post, 24, opposite blocks, 48, and approximately central with respect to the gate. An upwardly inclined slot, 50, is formed in the lock block, 49, back from the end, and is adapted to force a latch bar, 51, on the gate, upwardly and then allow it to drop into locking position during the final closing movement of the gate. The inclined slot terminates below the upper edge of block, 49, to form a shoulder, 52, for confining the latch bar in position and preventing outward swinging of the forward end of the gate. The latch bar is pivoted to the gate and is enclosed by a bracket, 53, on upright, 10, for maintaining the latch in operating position. Grip lugs, 54 and 55, are provided on the end of latch bar, 51, and bracket, 53, for unlocking the gate and drawing the same rearwardly in opening direction. In the closing of the gate, the latch bar, 51, will ride up the incline and automatically lock itself in place, while the gate is arrested against further forward movement by the upright, 10, abutting the block, 49.

Where a gate of this character is used in an outdoor fence and is therefore exposed to the weather, I find it preferable to use so-called "oil-less" pulleys or rollers which are made of maple blocks impregnated with oil and which therefore remain sufficiently lubricated for a long period of time and also resist the action of the weather. This is particularly desirable in the case of the rollers, 30 and 31, which carry the principal load; and when all the rollers are of this character the operation of the gate remains easy and quiet for an extended period of time.

I claim:—

1. In a gate adapted to be moved longitudinally for opening and closing, the upper part of said gate being provided with a track, an overhanging arm extending from the rear end of the gate and serving as a continuation of said track, a pair of spaced uprights toward which the gate opens, rollers carried on said uprights engaging three sides of the track for supporting and guiding said gate.

2. In a gate adapted to be moved longitudinally for opening and closing, the upper and lower edges of said gate being provided with tracks, an overhanging arm at the rear end of the gate forming a continuation of said upper track, a pair of longitudinally spaced uprights positioned at the side of the gate opening toward which said gate opens, rollers carried on the uprights, engaging the upper and lower surfaces of the top track for supporting said gate, vertically disposed rollers on the uprights positioned to engage the outer edge of said top track and maintain said gate in true alignment between said vertically disposed rollers and the uprights, and a vertically disposed roller positioned near the bottom of the upright adjacent the opening, adapted to engage the outer surface of the lower track for preventing lateral sway of the gate.

3. In a gate adapted to be moved longitudinally for opening and closing, the upper edge of said gate being provided with a track, an overhanging arm extending from the rear end of the gate as a continuation of said track, a pair of spaced uprights positioned on the side of the gate opening toward which said gate opens, rollers carried on the uprights engaging the upper and lower surfaces of said track for guidingly supporting said gate, and vertically disposed rollers on said uprights, positioned to engage the outer surface of the track adapted to maintain the inside surface of said track adjacent said uprights, said inside surface of the track being less than the vertical dimension of the track to reduce the frictional resistance of said inside track surface against the uprights, when said gate is moved to open or closed positions.

FREDERICK H. BEACH.